(12) United States Patent
Luo et al.

(10) Patent No.: US 12,208,637 B2
(45) Date of Patent: Jan. 28, 2025

(54) PATTERNING OF OPTICAL DEVICE FILMS VIA INKJET SOLUBLE MASK, DEPOSITION, AND LIFT-OFF

(71) Applicant: Applied Materials, Inc., Santa Clara, CA (US)

(72) Inventors: Yingdong Luo, Newark, CA (US); Jinyu Lu, Santa Clara, CA (US); Takashi Kuratomi, San Jose, CA (US); Alexia Adilene Portillo Rivera, Sunnyvale, CA (US); Xiaopei Deng, San Jose, CA (US); Zhengping Yao, Cupertino, CA (US); Daihua Zhang, Los Altos, CA (US); Rami Hourani, Santa Clara, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 163 days.

(21) Appl. No.: 18/167,682

(22) Filed: Feb. 10, 2023

(65) Prior Publication Data
US 2024/0270007 A1 Aug. 15, 2024

(51) Int. Cl.
B41M 3/00 (2006.01)
B41J 11/00 (2006.01)
G02B 27/01 (2006.01)

(52) U.S. Cl.
CPC ........ *B41M 3/003* (2013.01); *B41J 11/00212* (2021.01); *G02B 27/0172* (2013.01)

(58) Field of Classification Search
CPC ..... B41J 11/00212; B41M 3/003; G02B 6/12; G02B 6/132
See application file for complete search history.

(56) References Cited

U.S. PATENT DOCUMENTS

| | | | |
|---|---|---|---|
| 10,838,121 B1 * | 11/2020 | Mohanty | G02B 5/1857 |
| 2019/0324176 A1 * | 10/2019 | Colburn | G02B 27/0172 |
| 2023/0193064 A1 * | 6/2023 | Luo | B41M 5/5209 |
| | | | 347/100 |

* cited by examiner

*Primary Examiner* — Anh T Vo
(74) *Attorney, Agent, or Firm* — Patterson + Sheridan, LLP

(57) ABSTRACT

Embodiments of the present disclosure generally relate to optical devices. More specifically, embodiments described herein relate to optical devices and methods of manufacturing a patterned optical device film on an optical device substrate. According to certain embodiments, an inkjet deposition process is used to deposit a patterned inkjet coating layer on the optical device substrate. A deposition process may then be used to deposit an optical device material on the patterned inkjet coating and the optical device substrate. The patterned inkjet coating on the optical device substrate may then be washed with an appropriate detergent to lift-off the patterned inkjet coating layer from the optical device substrate to form the patterned optical device film.

20 Claims, 6 Drawing Sheets

PATTERNING OF OPTICAL DEVICE FILMS VIA INKJET SOLUBLE MASK, DEPOSITION, AND LIFT-OFF

BACKGROUND

Field

Embodiments of the present disclosure generally relate to optical devices. More specifically, embodiments described herein relate to optical devices and methods of manufacturing optical devices.

Description of the Related Art

Virtual reality is generally considered a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that visually replaces an actual environment in a user's field of vision.

Augmented reality, however, enables an experience in which a user can still see through the display lenses of the glasses or other HMD device to view the surrounding environment, yet also see images of virtual objects that are generated for display, and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Augmented waveguide combiners are used to assist in overlaying images. Generated light is in-coupled into an augmented waveguide combiner, propagated through the augmented waveguide combiner, out-coupled from the augmented waveguide combiner, and overlaid on the ambient environment. Light is coupled into and out of augmented waveguide combiners using surface relief gratings.

Manufacturing of optical devices includes sub-micron scale patterning of optical device films on optical device substrates.

Accordingly, what is needed in the art are improved methods for optical device fabrication.

SUMMARY

The present disclosure generally relates to methods and systems for fabricating a patterned optical device film on an optical device substrate. The method includes depositing a plurality of liquid ink drops on the optical device substrate from one or more nozzles of an inkjet deposition system. The plurality of liquid ink drops comprise a soluble film fluid. The method then continues with treating the plurality of liquid inks on the optical device substrate to form a patterned inkjet coating layer on the optical device substrate. An optical device material is then deposited by a substrate processing system on the patterned inkjet coating layer and the optical device substrate. The optical device substrate may then be immersed in a detergent capable of dissolving the patterned inkjet coating layer. The exposure of the patterned inkjet coating layer to the detergent may then lift-off the patterned inkjet coating layer from the optical device substrate to form the patterned optical device film.

In another embodiment, another method for fabricating a patterned optical device film on an optical device substrate is described. The method includes disposing an optical device substrate on an inkjet deposition platform of an inkjet deposition system and depositing a plurality of liquid ink drops on the optical device substrate from one or more nozzles of an inkjet device. The plurality of liquid ink drops comprises a soluble film fluid. The method then continues with treating the plurality of liquid inks on the optical device substrate to form a patterned inkjet coating layer on the optical device substrate. Thereafter, the optical device substrate is transferred to a deposition process chamber of a substrate processing system and an optical device material may then be deposited on the patterned inkjet coating layer and the optical device substrate. The method further includes immersing the optical device substrate in a detergent, the detergent being capable of dissolving the patterned inkjet coating layer, and agitating the optical device substrate in the detergent by performing a sonication process to lift-off the patterned inkjet coating layer from the optical device substrate. The lift-off of the patterned inkjet coating layer and portions of the optical device film deposited thereon from the optical device substrate form the patterned optical device film.

In yet another embodiment, a non-transitory computer-readable medium stores instructions that, when executed by a processor, cause a computer system deposit a plurality of liquid ink drops on an optical device substrate using an inkjet deposition system and perform a treatment on the liquid ink drops to form a patterned inkjet coating layer on the optical device substrate. The computer system also deposits an optical device material on the patterned inkjet coating layer and the optical device substrate using a substrate processing system, and immerses the optical device substrate in a detergent. The detergent is capable of dissolving the patterned inkjet coating layer to enable the lift-off the patterned inkjet coating layer from to form a patterned optical device film on the optical device substrate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein provide methods and systems for fabricating patterned optical device films on an optical device substrate by lifting-off portions of optical device material deposited on the optical device substrate using a patterned soluble inkjet coating underneath the optical device material. Advantages of the present disclosure include forming micron scale patterned optical device films at approximately one tenth of the cost as compared to traditional lithography and etch processes.

Figure 1:
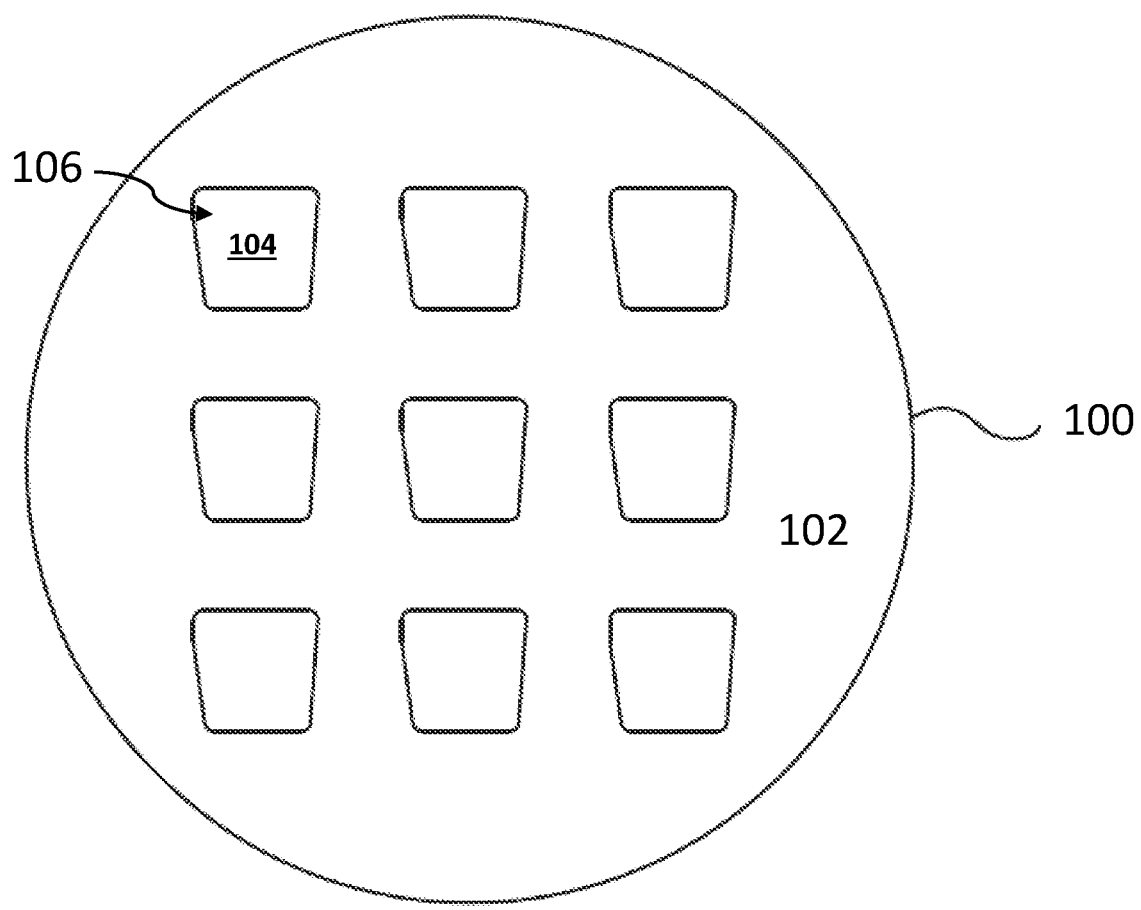
FIG. 1 depicts a perspective, frontal view of a patterned optical device layer on an optical device substrate, according to embodiments described herein.

FIG. 1 is a perspective, frontal view of a substrate with a patterned optical device film formed thereon, according to embodiments described herein. In certain embodiments, the substrate depicted in FIG. 1 may be an optical device substrate 100. Optical device substrate 100 includes a patterned optical device film 102 disposed on a surface 104 of the optical device substrate 100. Patterned optical device film 102 includes a plurality of openings 106 in which portions of the surface 104 of optical device substrate 100 are exposed. Optical devices such as flat optical devices or waveguide combiners utilized for virtual, augmented, or mixed reality may subsequently be formed on the exposed portions of surface 104 of optical device substrate 100. In some embodiments, which can be combined with other embodiments described herein, patterned optical device film 102 may provide a functional coating for optical devices formed on the optical device substrate 100 in the openings 106.

The optical device substrate 100 can be any suitable substrate on which an optical device or optical device film may be formed. In some embodiments, the optical device substrate 100 can be either opaque or transparent to a chosen laser wavelength depending on the use of the optical device substrate 100. The processing of the optical device substrate 100 disclosed herein may include an inkjet printing process. In some embodiments, the optical device substrate 100 includes, but is not limited to, silicon (Si), silicon nitride (SiN), silicon dioxide (SiO2), fused silica, quartz, silicon carbide (SiC), germanium (Ge), silicon germanium (SiGe), indium phosphide (InP), gallium arsenide (GaAs), gallium oxide (GaO), diamond, lithium niobate (LiNbO3), gallium nitride (GaN), sapphire, tantalum oxide (Ta2O5), titanium dioxide (TiO2), or combinations thereof.

Additionally, the optical device substrate 100 may be of varying shapes, thicknesses, and diameters. For example, the optical device substrate 100 may have a diameter of about 150 mm to about 300 mm. The optical device substrate 100 may have a circular, rectangular, or square shape. The optical device substrate 100 may have a thickness of between about 300 μm to about 1 mm. The optical device substrate may have a diameter in a range from about 100 mm to about 750 mm. In one example, the optical device substrate has a surface area of about 1,000 cm² or more. In another example, the surface area of the optical device substrate 100 may be about 2,000 cm² or more, and about 4,000 cm² or more. Although only nine openings 106 for optical devices are shown on the optical device substrate 100, patterned optical device film 102 may be formed to accommodate any number of optical devices on the surface 104 of the optical device substrate 100.

Figure 2A:
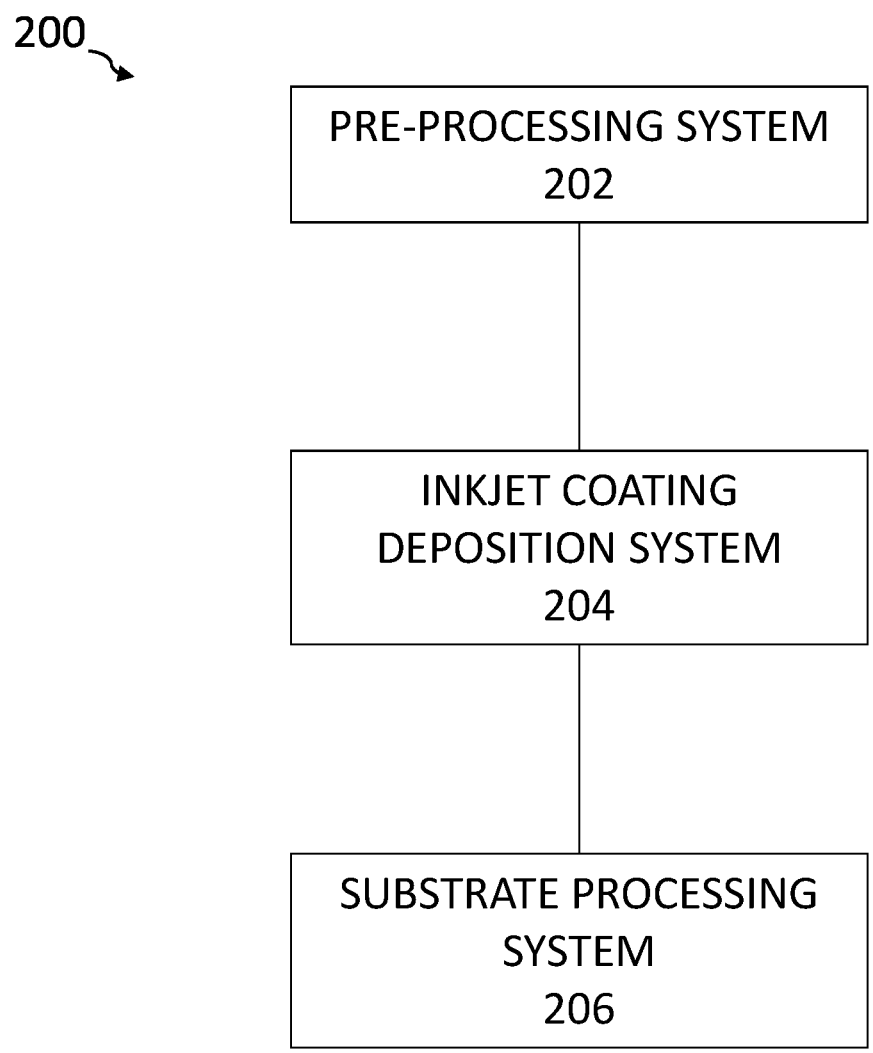
FIG. 2A depicts a system capable for use in fabricating the patterned optical device layer in FIG. 1, according to embodiments described herein.

FIG. 2A depicts a system 200 for fabrication of a patterned optical device film on an optical device substrate, according to certain embodiments. System 200 includes pre-processing system 202, inkjet deposition system 204, and substrate processing system 206 for fabricating a patterned optical device film. Pre-processing system 202 includes one or more systems for performing pre-processing treatments on an optical device substrate prior to depositing one or more inkjet coating layers using an inkjet deposition system 204 discussed below, according to certain embodiments. Pre-processing system 202 may include, either alone or in combination, one or more systems capable of pre-processing the optical device substrate. Pre-processing treatments include but are not limited to plasma cleaning, lithography, baking, cooling, curing, deposition, surface modification, polishing, and imprinting. As would be appreciated by one of skill in the art, there may be other systems for other processes that may be needed prior to the localized inkjet coating deposition by inkjet deposition system 204.

In some embodiments, prior to the deposition of one or more inkjet coating layers by inkjet deposition system 204, pre-processing system 202 may be used to form a plurality of chemicals stoppers on a top surface of the optical device substrate. The plurality of chemical stoppers may be configured to reduce the flow of the ink deposited by inkjet deposition system 204. The chemical stopper may be made to be chemically compatible with the ink used by the inkjet deposition system 204. The chemical stopper may form a border within which the ink drops are deposited. The chemical stopper may therefore contain the ink drops within a designated area and improves inkjet device resolution and fidelity of the features formed by the ink drops of inkjet deposition system 204. In some embodiments, the chemical stoppers may be formed on the optical device substrate by pre-processing system 202 using a lithography operation. In other embodiments, the chemical stoppers may be formed on the optical device substrate by pre-processing system 202 using an inkjet device, such as inkjet deposition system 204.

Figure 2B:
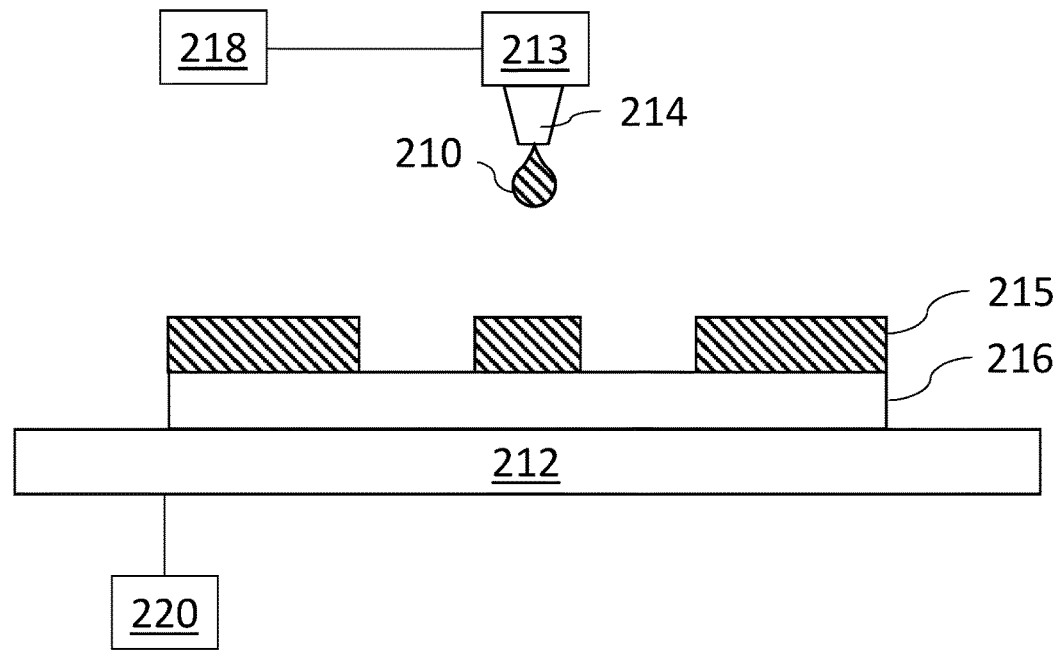
FIG. 2B depicts a schematic cross-sectional view of an inkjet deposition system capable for use in the system in FIG. 2A, according to certain embodiments described herein.

FIG. 2B is a schematic cross-sectional view of an inkjet deposition system capable for use in system 200, according to certain embodiments. Inkjet deposition system 204 is a system for locally depositing a patterned inkjet coating layer 215 on an optical device substrate, according to certain embodiments. Inkjet deposition system 204 includes an inkjet device 208 or inkjet printer having an inkjet 213 and an inkjet deposition platform 212 for receiving an optical device substrate 216. Inkjet 213 is capable of providing defined volumes of a liquid ink or combinations of a liquid ink and particulate matter, encapsulated in a droplet as liquid ink drops 210. Liquid ink drops 210 from inkjet 213 may be deposited on optical device substrate 216 by a nozzle 214. In some embodiments, inkjet device 208 may include more than one nozzle 214 for dispensing liquid ink drops 210 from an ink source 218. When optical device substrate 216 is disposed on the inkjet deposition platform 212, inkjet device 208 may locally deposit defined volumes of liquid ink drops 210 on specific portions of optical device substrate 216. The liquid ink drops 210 deposited by Inkjet device 208 may therefore be used in the application to form a patterned liquid inkjet coating layer on optical device substrate 216 by applying a plurality of liquid ink drops 210 on the optical device substrate in a desired pattern.

Upon depositing the patterned liquid inkjet coating layer on the optical device substrate 216, a treatment of the plurality of liquid ink drops 210 deposited on the optical device substrate 216 may be performed to cure and/or heat the liquid ink drops 210 to solidify and form the patterned inkjet coating layer 215 on optical device substrate 216. In certain embodiments, the patterned inkjet coating layer 215 may be an organic or water soluble coating layer capable of lifting-off from the optical device substrate 216 when exposed to an appropriate detergent. In other embodiments, alternatives to inkjet deposition system 204 include spin coating systems, photolithography systems, dip coating systems, or other systems capable of applying the patterned inkjet coating layer, either alone or in combination with systems described herein.

Liquid ink drops 210 used in inkjet deposition system 204 for forming organic or water soluble inkjet coating layers may include polymers, photo curable components, solvents, additives, and combinations thereof. Solvents including organic solvents based on esters, ethers, and alcohols whose boiling point is lower than 300° C. at 1 atm may be used.

Examples of organic solvents include DPGME(34590-94-8), DPGBE(29911-28-2), TPGME(25498-49-1), DPGPE (29911-27-1), DPGDME(111109-77-4), TPGBE(55934-93-5), PGBE(5131-66-8), DEGME(111-77-3), DEGEE(111-90-0), TEGME(112-35-6), PGME(107-98-2), PGPE(1569-01-3), PGMEA(204-65-6), DPGMEA(88917-22-0), ethanol (64-17-5), methanol(67-56-1), isopropanol(67-63-0), 1-butanol(71-36-3), 2-butanol(78-92-2), 1-pentanol (71-41-0), 2-pentanol(6032-29-7), 3-pentanol(584-02-1), 1-hexanol (111-27-3), 2-hexanol(626-93-7), 3-hexanol(623-37-0), butyl acetate(123-86-4), butyl lactate(138-22-7), or any mixtures thereof.

Examples of polymers include Polyvinylpyrrolidone (PVP), Povidone, Kollidon, combinations/blends of other polymers with PVP (e.g. Kollidon SR), copolymers of polyvinylpyrrolidone, including block copolymer and random/alternative copolymers (e.g. polyvinylpyrrolidone-co-polyvinylalcohol, such as Copovidone, or called Kollidone VA), pollypropylene glycol, polyethylene glycol, copolymers of pollypropylene glycol or polyethylene glycol (e.g. Pluronics (PEO-b-PPO-b-PEO)) of varying grades (e.g. F-68 or F-127), partially hydrolyzed polyvinyl acetate (PVA) (e.g. Hydrolyzed %<90%), combinations/blends of other polymers with PVA. Examples of photo curable components include monomers (e.g. water soluble (meth)acrylates or epoxy), crosslinkers (e.g water soluble multi-functional (meth)acrylates or epoxy), oligomers (e.g. water soluble (meth)acrylates or epoxy functionalized oliogmers), mixtures thereof, and photoinitators that generate radicals or protons upon exposure to UV or visible light.

Examples of additives include surfactants or other polymers that may be used to tune the surface tension of the fluids and photo or thermal initiators. In some embodiments, mixtures with $H_2O$ (e.g. $H_2O$ content range from 0% to 80%) may also be used.

The one or more nozzles 214, and related pumps, may provide a defined volume of fluid in each liquid ink drop 210, and vary the number of liquid ink drops 210 deposited per unit of time, enabling the inkjet deposition system 204 to vary the thickness of the material deposited on the optical device substrate 216. By varying the number of liquid ink drops 210 deposited per unit of time, the extent of reflow by the liquid ink drops 210 on the optical device substrate may be limited, and a material of variable profile shape may be deposited on the optical device substrate, such as a wedge. Alternatively, or additionally, the relative volume of two or more fluids contained in a droplet may be varied, enabling a consistent profile shape to be deposited on the optical device substrate having variable refractive index properties that vary over the consistent profile shape at a linear, exponential, geometric, or variable rate. According to some embodiments, the relative volume of materials making up the deposited fluid may be deposited in varying volumes, enabling variable profile structures that can additionally vary as the relative volume of the fluids vary during deposition.

A controller 220 is coupled to the inkjet device 208 or the inkjet deposition platform 212. The controller 220 is configured to supply instructions to the inkjet device 208. The controller 220 further receives input from sensors within the inkjet device 208. For example, the controller 220 may be configured to control output of ink from the inkjet 213 as well as movement of the inkjet deposition platform 212. The controller 220 may also be configured to control all aspects of heating and actuation of the inkjet deposition platform 212. The controller 120 may also be connected to one or more systems of system 200, such as pre-processing systems 202 and substrate processing system 206. The controller 120 may therefore also be configured to control the transferring of the optical device substrate 216 between the various systems, as well as the processing of the optical device substrate 216 in such systems as required to perform the methods disclosed herein.

The controller 220 includes a programmable central processing unit (CPU) that is operable with a memory and a mass storage device, an input control unit, and a display unit (not shown), such as power supplies, clocks, cache, input/output (I/O) circuits, and the like, coupled to the various components of the inkjet device 208 to facilitate control of optical device substrate processing. The controller 220 also includes hardware or software for monitoring substrate processing through sensors in the inkjet device 208, including sensors monitoring flow, RF power, electric field and the like. Other sensors that measure system parameters such as substrate temperature, chamber atmosphere pressure and the like, may also provide information to the controller 220.

To facilitate control of the inkjet device 208 and associated ink drop formation, the CPU may be one of any form of general purpose computer processor that can be used in an industrial setting, such as a programmable logic controller (PLC), for controlling various chambers and sub-processors. The memory is coupled to the CPU and the memory is non-transitory and may be one or more of readily available memory such as random access memory (RAM), read only memory (ROM), floppy disk drive, hard disk, or any other form of digital storage, local or remote. Support circuits are coupled to the CPU for supporting the processor in a conventional manner. The plasma and electric field formation and other processes are generally stored in the memory, typically as a software routine. The software routine may also be stored and/or executed by a second CPU that is remotely located from the hardware being controlled by the CPU.

The memory is in the form of computer-readable storage media that contains instructions, that when executed by the CPU, facilitates the operation of inkjet device 208. The instructions in the memory are in the form of a program product such as a program that implements the method of the present disclosure. The program code may conform to any one of a number of different programming languages. In one example, the disclosure may be implemented as a program product stored on computer-readable storage media for use with a computer system. The program(s) of the program product define functions of the embodiments (including the methods described herein).

In certain embodiments, the program(s) embody machine learning capabilities. Various data features include process parameters such as processing times, temperatures, pressures, voltages, polarities, powers, gas species, precursor flow rates, and the like. Relationships between the features are identified and defined to enable analysis by a machine learning algorithm to ingest data and adapt processes being performed by the inkjet device 208. The machine learning algorithms may employ supervised learning or unsupervised learning techniques. Examples of machine learning algorithms embodied by the program include, but are not limited to, linear regression, logistic regression, decision tree, state vector machine, neural network, naïve Bayes, k-nearest neighbors, K-Means, random forest, dimensionality reduction algorithms, and gradient boosting algorithms, among others.

Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure. In some embodiments, the controller 220 is an Ethernet for Control Automation Technology (EtherCAT) controller.

System 200 further includes a substrate processing system 206 for depositing a device film on the optical device substrate and the patterned inkjet coating layer deposited by the inkjet deposition system 204. Substrate processing system 206 may include any type of deposition process system for forming a device film, such as an optical device film, on the optical device substrate. Examples of substrate processing system 206 include deposition process systems for chemical vapor deposition (CVD), flowable CVD, atomic layer deposition (ALD), physical vapor deposition (PVD), or the like, an epitaxy-based processing system or the like, or other system that may deposit or otherwise provide for material build up on the optical device substrate.

Figure 3:
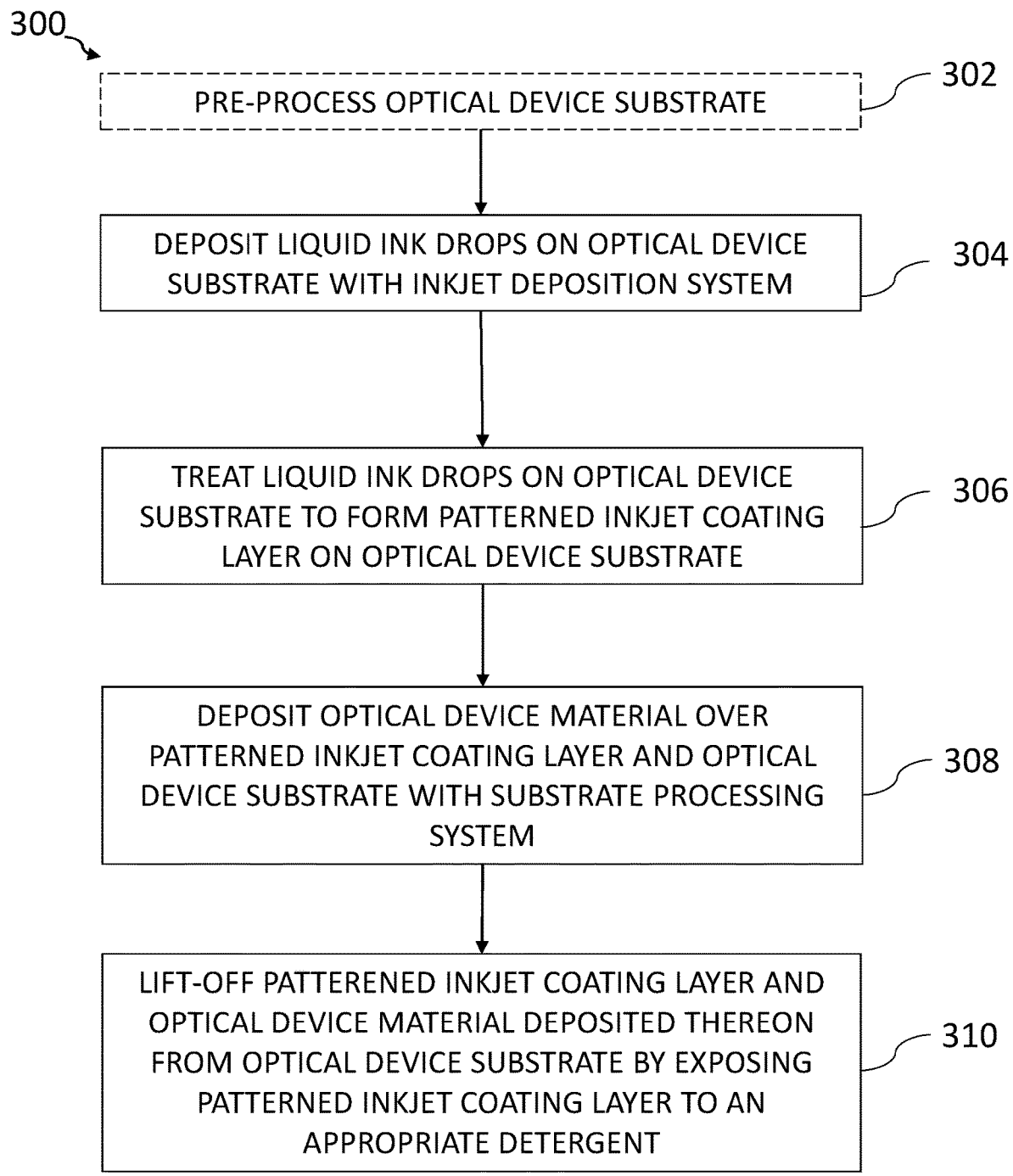
FIG. 3 depicts a flow diagram for a method for fabrication of a patterned optical device layer on an optical device substrate, according to embodiments described herein.
Figure 4A:
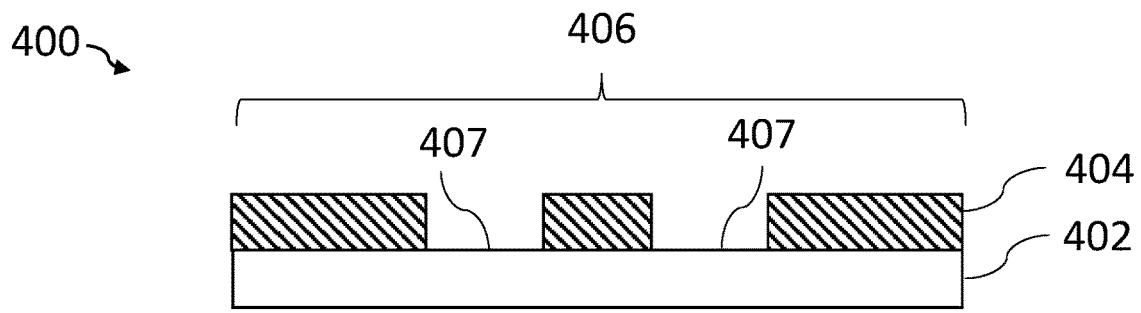
FIGS. 4A-4D depict cross-sectional views of a workpiece at different stages of the method in FIG. 3, according to embodiments described herein.
Figure 4B:
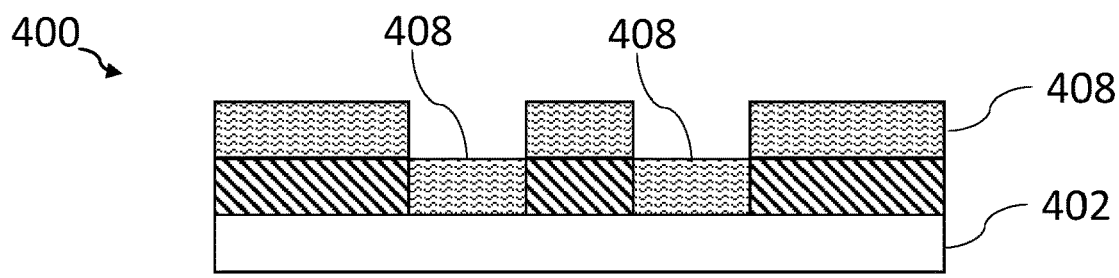
Figure 4C:
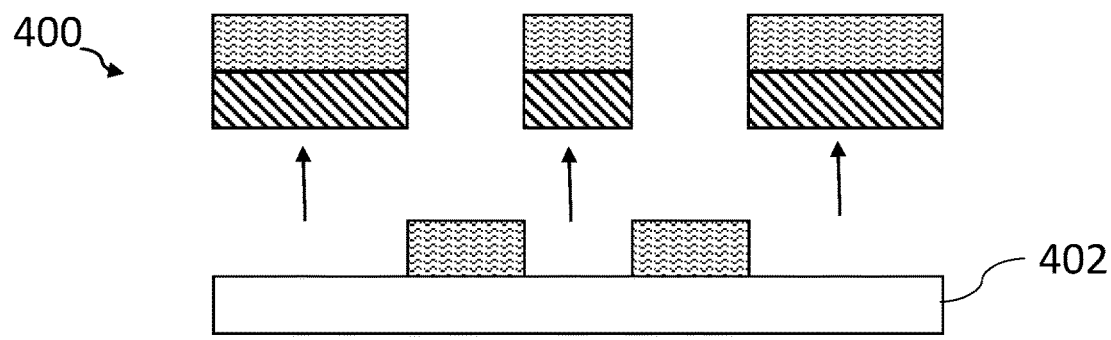
Figure 4D:
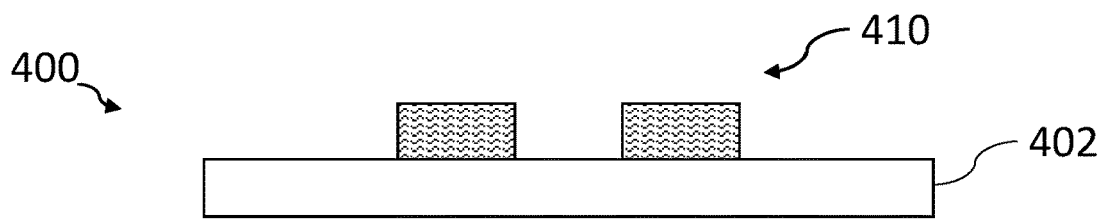

FIG. 3 depicts a flow diagram of a method 300 for fabrication of a patterned optical device layer on an optical device substrate using system 200, according to certain embodiments described here. FIGS. 4A-4C depict cross-sectional views of a workpiece 400 formed utilizing the method 300 shown in FIG. 3, according to embodiments described herein. Method 300 may be used to form a patterned optical device film 410 on an optical device substrate 402, as shown in FIG. 4D.

Method 300 begins at operation 302 with an optical device substrate, such as the optical device substrate 402 in workpiece 400 depicted in FIG. 4A, being optionally processed, such as by pre-processing system 202 discussed herein. In some embodiments, pre-processing system 202 may include a deposition chamber or an etching chamber, such as a pre-cleaning processing chamber for pre-cleaning the optical device substrate. In some embodiments, operation 302 may include depositing chemical stoppers on the optical device substrate 402 to reduce reflow of the liquid ink to be deposited on the optical device substrate 402 by the inkjet deposition system 204 in method 300. The chemical stoppers may provide a barrier to reflow of the liquid ink to be deposited on the optical device substrate by the inkjet deposition system 204. In some embodiments, operation 302 may be skipped and optical device substrate 402 may not be processed by pre-processing system 202 and method 300 begins with operation 304.

In operation 304, inkjet deposition system 204 deposits an inkjet coating layer 404 on optical device substrate 402, as depicted in FIG. 4B. Inkjet coating layer 404 may comprise an organic or water soluble film fluid to enable lift-off of optical device films deposited thereon. In some embodiments, inkjet deposition system 204 may locally deposit the inkjet coating layer 404 as liquid ink drops on portions of the optical device substrate 402 a patterned liquid inkjet coating layer such that inkjet coating layer 404 may include a pattern 406. In the patterned inkjet coating layer, one or more portions 407 of optical device substrate 402 underneath the inkjet coating layer 404 may be exposed. In some embodiments, the pattern 406 of inkjet coating layer 404 may correspond to negative portions of a patterned optical device film to be formed on optical device substrate 402, such as the plurality of openings 106 in the patterned optical device film 102 depicted in FIG. 1. In other embodiments, the pattern 406 of inkjet coating layer 404 may correspond to negative portions of a patterned optical device film to be formed on a material on the optical device substrate 402.

After the deposition of inkjet coating layer 404 by inkjet deposition system 204, the liquid ink drops of inkjet coating layer 404 may be treated at an operation 306. Treating the liquid ink drops of inkjet coating layer 404 may include a heat treatment such as a baking, a spin dry evaporative treatment, a thermal evaporative treatment, a UV curing operation, and the like. Once the liquid ink drops of inkjet coating layer 404 are treated, the inkjet coating layer 404 may become solid. In some embodiments, the inkjet coating layer 404 includes a thickness between about 0.1 nm and about 10 μm, such as between about 0.5 nm and about 5 μm.

In some embodiments, the baking and/or UV curing of the liquid ink drops of inkjet coating layer 404 may be performed to remove solvent from the liquid ink. Baking the liquid ink at operation 306 is performed at a bake temperature of about 60° C. to about 200° C., such as about 80° C. to about 140° C., such as about 100° C. to about 120° C.

In operation 308, an optical device material 408 is conformally deposited on inkjet coating layer 404 and the exposed portions 407 of optical device substrate 402 by substrate processing system 206. In some embodiments, optical device material 408 may include SiOx, TiOx, NbOx, other oxides, SiN, or other nitrides deposited by substrate processing system 206 using CVD. In some embodiments, optical device material 408 may be deposited by substrate processing system 206 using flowable CVD. In some embodiments, optical device material 408 may include Al, Ag, Cr, metals, SiOx, TiOx, NbOx, other oxides, SiN, or other nitrides deposited by substrate processing system 206 using PVD. In some embodiments, optical device material 408 may include TiOx deposited by substrate processing system 206 using ALD. In other embodiments, optical device material 408 may include self-assembled monolayers or polymer/oligomer brushes. In further embodiments, optical device material 408 may include inorganic films made by a sol-gel solution, organic films made by polymer or curables, or nanoparticle composite films made by nanoparticles and binders (polymer or curables) deposited by inkjet deposition systems, such as inkjet deposition system 204, spin coating systems, or dip coating systems.

In certain embodiments, the thickness of the optical device material 408 may vary depending on the material and function of the patterned optical device film 410. In some embodiments, optical device material 408 may be deposited with a thickness between about 1 nm and about 300 nm, such as between about 1 nm and 10 nm and between 10 nm and about 250 nm, such as between about 30 nm and about 100 nm, and between about 150 nm and about 250 nm.

In operation 310, the inkjet coating layer 404 and corresponding portions of optical device material 408 deposited thereon are immersed in a detergent appropriate for washing and lifting-off the inkjet coating layer 404 and portions of the optical device material 408 deposited thereon from optical device substrate 402 of workpiece 400, as depicted in FIG. 4C. In certain embodiments, the detergent used for washing workpiece 400 may be water or a respective organic solvent capable of dissolving the inkjet coating layer 404. The detergent used may therefore depend on the material used for inkjet coating layer 404. The detergent used may also depend on the material of optical device material 408. In some embodiments where more than one detergent may be used to lift-off the inkjet coating layer 404, the detergent capable of better permeating through the optical device material 408 to reach the inkjet coating layer 404 underneath may be used.

In certain embodiments, the lift-off of the inkjet coating layer 404 includes soaking the workpiece 400 in the detergent. The amount of time the workpiece 400 is soaked in detergent may depend on the material and thickness of optical device material 408 deposited thereon, which may in turn affect the permeability of the detergent being used to remove or dissolve the inkjet coating layer 404 through optical device material 408. In certain embodiments, optical device material 408 may be extremely thick and/or comprise properties that repel the detergent used, thereby requiring a longer soak time for inkjet coating layer 404 to be dissolved. In certain embodiments, the workpiece 400 may be soaked in the detergent for between about 15 minutes and about 6 hours, such as between about 30 minutes and about 3 hours, such as between about 1 hour and about 2.5 hours.

In certain embodiments, the lift-off of the inkjet coating layer 404 may also include agitating the workpiece 400 in the detergent, such as by a sonication process to release the inkjet coating layer 404 and optical device material 408 deposited thereon from the optical device substrate 402. In certain embodiments, the agitating or sonication process may be performed before, during, and/or after the soaking of workpiece 400 in the detergent used for performing the lift-off of inkjet coating layer 404. In certain embodiments, the agitating or sonication process may be performed for between about 3 minutes and 15 minutes, such as between about 5 minutes and 10 minutes.

Upon the lift-off of the inkjet coating layer 404 and portions of the optical device material 408 deposited thereon, portions of optical device material 408 may remain on the optical device substrate 402 thereby resulting in the patterned optical device film 410 formed on the optical device substrate 402 as shown in FIG. 4D. The patterned optical device film 410 may be complementary to or the inverse of the pattern 406 of the inkjet coating layer 404 deposited on the optical device substrate 402 in operation 304 and lifted-off in operation 310.

In certain embodiments, the patterned optical device film 410 may correspond to a functional coating layer deposited on workpiece 400. In certain embodiments, patterned optical device film 410 may comprise an anti-reflective coating, a refractive index specific coating, or a reflective or mirror coating. In certain embodiments, patterned optical device film 410 may comprise a coating configured to provide surface tension control for workpiece 400.

In certain embodiments, patterned optical device film 410 may be formed directly on optical device substrate 402. For example, as applied to FIG. 1, patterned optical device film 410 on the optical device substrate 402 as shown in FIG. 4D may correspond to patterned optical device film 102 formed on the surface 104 of optical device substrate 100 shown in FIG. 1. The patterning of patterned optical device film 410 formed by the lift-off of the inkjet coating layer 404 may therefore correspond with the plurality of openings 106 of patterned optical device film 102. In some embodiments, the patterned optical device film 410 may provide a functional coating for optical devices, such as an augmented reality waveguide combiner, and flat optical devices, such as metasurfaces, subsequently formed on the optical device substrate 402. In some embodiments, the patterned optical device film 410 may be formed as an anti-reflective coating layer to assist in the manufacturing of optical devices on the optical device substrate 402. In certain embodiments, patterned optical device film 410 may also be formed on materials on optical device substrate 402.

Example Method

Figure 5:
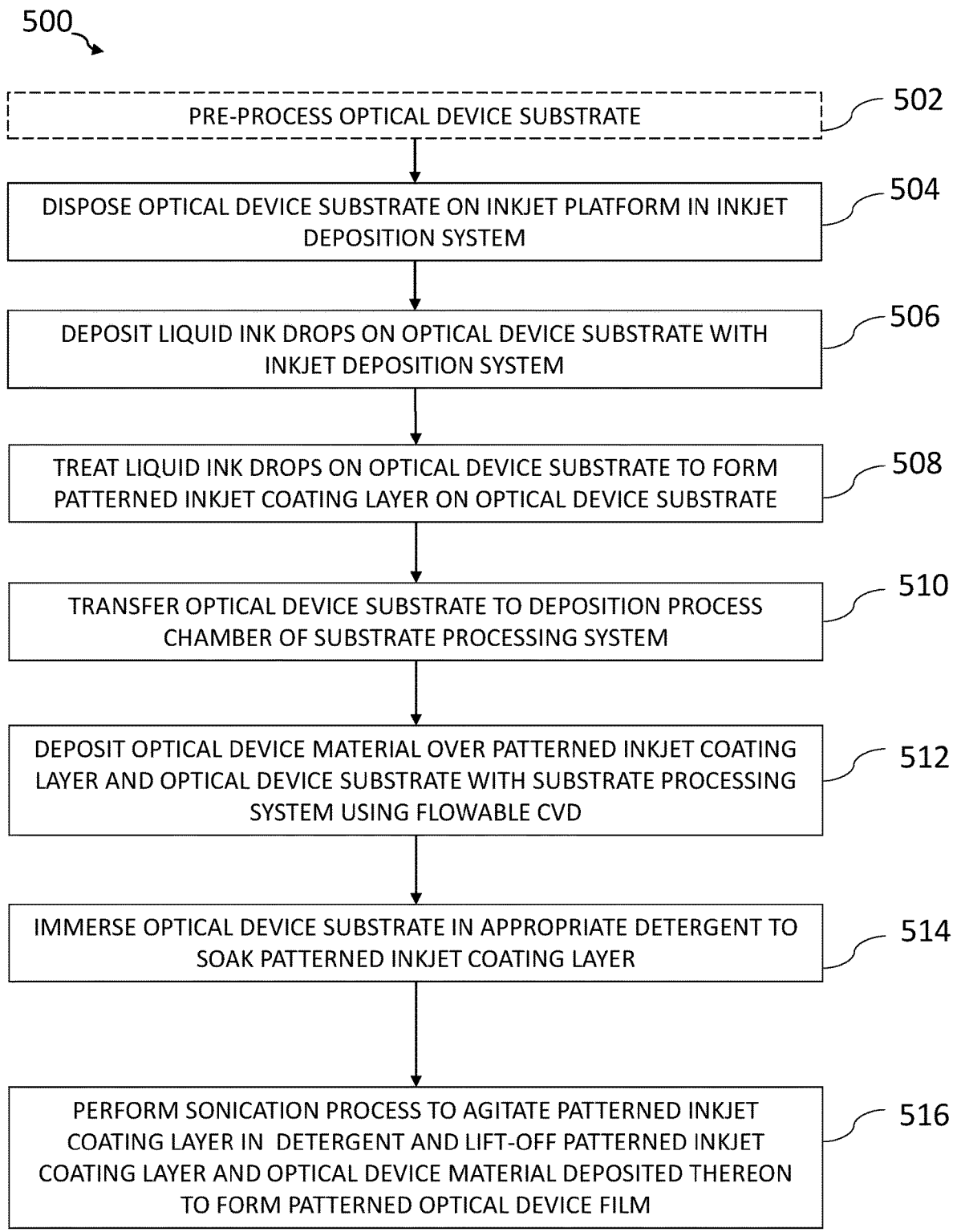
FIG. 5 depicts a flow diagram for a method for fabrication of a patterned optical device layer on an optical device substrate, according to embodiments described herein.

FIG. 5 depicts a flow diagram of a method 500 for fabrication of a patterned silicon dioxide optical device layer on a silicon optical device substrate using system 200, according to certain embodiments described here. In method 500, silicon dioxide material deposited on a soluble inkjet coating layer is cleanly lifted-off a silicon optical device substrate by soaking the silicon optical device substrate in a detergent and agitating the silicon optical device substrate using a sonication process.

Method 500 begins at operation 502 with a silicon optical device substrate being optionally processed, such as by pre-processing systems 202. In some embodiments, pre-processing systems 202 may include an etching chamber, such as a pre-cleaning processing chamber. In some embodiments, operation 502 may be skipped and the optical device substrate may not be processed by pre-processing system 202, and method 500 begins with operation 504.

In operation 504, the silicon optical device substrate may be disposed on an inkjet platform of inkjet deposition system 204. In operation 506, inkjet deposition system 204 may deposit a plurality of liquid ink drops from an inkjet nozzle to form a patterned liquid inkjet coating layer on the optical device substrate. The patterned liquid inkjet coating layer deposited on the optical device substrate may comprise a soluble film fluid, such as an organic or water soluble film fluid. In some embodiments, inkjet deposition system 204 may locally deposit the plurality of liquid ink drops on portions of the silicon optical device substrate to form the patterned inkjet coating layer where one or more portions of the silicon optical device substrate underneath the patterned inkjet coating layer may be exposed.

After the deposition of the plurality of liquid ink drops by the inkjet deposition system 204, the plurality of liquid ink drops of the patterned inkjet coating layer may be treated at operation 508. Treating the plurality of liquid ink drops of the liquid patterned inkjet coating layer may include a heat treatment, such as a baking or a UV curing operation. Treating the liquid patterned inkjet coating layer in turn forms a patterned inkjet coating layer on the silicon optical device substrate.

In operation 510, the silicon optical device substrate and the patterned inkjet coating layer formed thereon may be transferred to a deposition chamber of substrate processing system 206. In operation 512, substrate processing system 206 may uniformly deposit an optical device material on the patterned inkjet coating layer and the exposed portions of silicon optical device substrate. In some embodiments, depositing the optical device material by substrate processing system 206 includes depositing silicon dioxide ($SiO_2$) using a flowable CVD process. In some embodiments, the optical device material made of silicon dioxide includes a thickness between about 50 nm and about 300 nm. In some embodiments, the silicon dioxide deposited by substrate processing system 206 includes a thickness of about 250 nm.

In operation 514, the silicon optical device substrate with the silicon dioxide and patterned inkjet coating layer deposited thereon are immersed in the detergent for lifting-off the patterned inkjet coating layer from the optical device substrate. In some embodiments, the patterned inkjet coating layer is soluble in the detergent to enable a clean lift-off of the patterned inkjet coating layer from the silicon optical device substrate. The lifting-off the patterned inkjet coating from the silicon optical device substrate in turn also lifts-off the silicon dioxide deposited thereon. In some embodiments, the silicon optical device substrate with the silicon dioxide and patterned inkjet coating layer deposited thereon are soaked in the detergent for about two (2) hours.

In operation 516, the silicon optical device substrate with the silicon dioxide optical device film and inkjet coating layer deposited thereon are agitated in the detergent by a sonication process for about five (5) minutes. The agitation of the silicon optical device substrate by the sonication process enables the patterned inkjet coating layer to be released from the silicon optical device substrate.

Upon the lift-off of the patterned inkjet coating layer and portions of the silicon dioxide deposited thereon, the remaining portions of the silicon dioxide deposited on the silicon optical device substrate may remain thereby resulting in the formation of the patterned silicon dioxide optical device film on the silicon optical device substrate. The patterning of the silicon dioxide optical device film may be complementary to or the inverse of the pattern of the patterned inkjet coating layer deposited on the silicon optical device substrate in operation 506 and lifted-off in operation 516.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. In addition, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

While the foregoing is directed to examples of the present disclosure, other and further examples of the disclosure may be devised without departing from the basic scope thereof, and the scope thereof is determined by the claims that follow.

What is claimed is:

1. A method for forming a patterned optical device film on an optical device substrate, comprising:
   depositing a plurality of liquid ink drops on the optical device substrate from one or more nozzles of an inkjet deposition system, the plurality of liquid ink drops comprising a soluble film fluid;
   treating the plurality of liquid ink drops on the optical device substrate to form a patterned inkjet coating layer on the optical device substrate;
   depositing an optical device material on the patterned inkjet coating layer and the optical device substrate; and
   immersing the optical device substrate in a detergent, the detergent being a solvent capable of dissolving the patterned inkjet coating layer, to lift-off the patterned inkjet coating layer from the optical device substrate to form the patterned optical device film.

2. The method of claim 1, further comprising:
   agitating the optical device substrate in the detergent to release the patterned inkjet coating layer from the optical device substrate.

3. The method of claim 2, wherein agitating the optical device substrate comprises performing a sonication process.

4. The method of claim 1, wherein treating the plurality of liquid ink drops on the optical device substrate comprises performing one of a UV curing operation or a heat treatment such as a bake, a spin dry evaporative treatment, or a thermal evaporative treatment.

5. The method of claim 1, wherein the patterned inkjet coating layer comprises an organic or water soluble film coating.

6. The method of claim 1, wherein depositing the optical device material comprises performing one of a chemical vapor deposition (CVD), flowable CVD, atomic layer deposition (ALD), physical vapor deposition (PVD), inkjet deposition, spin coating, dip coating, self-assembled monolayer, or polymer/oligomer brush process.

7. The method of claim 1, wherein depositing the plurality of liquid ink drops on the optical device substrate comprises locally depositing the plurality of liquid ink drops on portions of the optical device substrate to form a patterned liquid inkjet coating layer.

8. The method of claim 1, wherein the patterned optical device film has a thickness between about 0.01 nm and about 300 nm.

9. The method of claim 1, wherein lifting-off the patterned inkjet coating layer from the optical device substrate comprises lifting-off portions of the optical device material deposited thereon to form the patterned optical device film.

10. The method of claim 1, wherein the patterned optical device film comprises an anti-reflective coating, a refractive index specific coating, a reflective or mirror coating, or a coating configured to provide surface tension control.

11. The method of claim 1, wherein the patterned inkjet coating layer has a thickness between about 0.1 nm and about 10 μm.

12. A method for forming a patterned optical device film on an optical device substrate, suitable for use in semiconductor manufacturing, comprising:
- disposing the optical device substrate on an inkjet deposition platform of an inkjet deposition system having an inkjet device;
- depositing a plurality of liquid ink drops on the optical device substrate from one or more nozzles of the inkjet device, the plurality of liquid ink drops comprising a soluble film fluid;
- treating the plurality of liquid ink drops on the optical device substrate to form a patterned inkjet coating layer on the optical device substrate;
- transferring the optical device substrate to a deposition process chamber;
- conformally depositing an optical device material on the patterned inkjet coating layer and the optical device substrate;
- immersing the optical device substrate in a detergent, the detergent being a solvent capable of dissolving the patterned inkjet coating layer; and
- agitating the optical device substrate in the detergent by performing a sonication process to lift-off the patterned inkjet coating layer and portions of the optical device material deposited thereon from the optical device substrate to form the patterned optical device film.

13. A non-transitory computer-readable medium storing instructions that, when executed by a processor, cause a computer system to:
- deposit a plurality of liquid ink drops on an optical device substrate using an inkjet deposition system, the plurality of liquid ink drops comprising a soluble film fluid;
- perform a treatment on the plurality of liquid ink drops to cure the plurality of liquid ink drops to form a patterned inkjet coating layer on the optical device substrate;
- deposit an optical device material on the patterned inkjet coating layer and the optical device substrate using a substrate processing system; and
- immerse the optical device substrate in a detergent, the detergent being a solvent capable of dissolving the patterned inkjet coating layer to lift-off the patterned inkjet coating layer from the optical device substrate to form a patterned optical device film.

14. The non-transitory computer-readable medium of claim 13, further comprising instructions that, when executed by the processor, cause the computer system to agitate the optical device substrate in the detergent after immersing the optical device substrate in the detergent by performing a sonication process.

15. The non-transitory computer-readable medium of claim 13, wherein the treatment of the plurality of liquid ink drops is one of a UV curing operation or a heat treatment such as a bake, a spin dry evaporative treatment, or a thermal evaporative treatment.

16. The non-transitory computer-readable medium of claim 13, wherein the patterned inkjet coating layer comprises an organic or water soluble film coating.

17. The non-transitory computer-readable medium of claim 13, wherein to deposit the optical device material using the substrate processing system comprises to perform one of a chemical vapor deposition (CVD), flowable CVD, atomic layer deposition (ALD), physical vapor deposition (PVD), inkjet deposition, spin coating, dip coating, self-assembled monolayer process, or polymer/oligomer brush process.

18. The non-transitory computer-readable medium of claim 13, wherein to deposit the plurality of liquid ink drops on the optical device substrate comprises to locally deposit the plurality of liquid ink drops on portions of the optical device substrate to form a patterned liquid inkjet coating layer.

19. The non-transitory computer-readable medium of claim 13, wherein to lift-off the patterned inkjet coating layer from the optical device substrate comprises to lift-off portions of the optical device material deposited thereon to form the patterned optical device film on the optical device substrate.

20. The non-transitory computer-readable medium of claim 13, wherein to immerse the optical device substrate in the detergent to dissolve the patterned inkjet coating layer comprises to soak the optical device substrate and the patterned inkjet coating layer in the detergent for between about 15 minutes and about 6 hours, such as between about 30 minutes and about 3 hours, such as between about 1 hour and about 2.5 hours.

* * * * *